March 16, 1943.  C. B. SMITH ET AL  2,314,290
GLASS MOLDING MACHINE
Filed Sept. 18, 1941  3 Sheets-Sheet 1

C. B. Smith
J. R. Johnson
INVENTORS

BY *Rule and Hoge*
ATTORNEYS

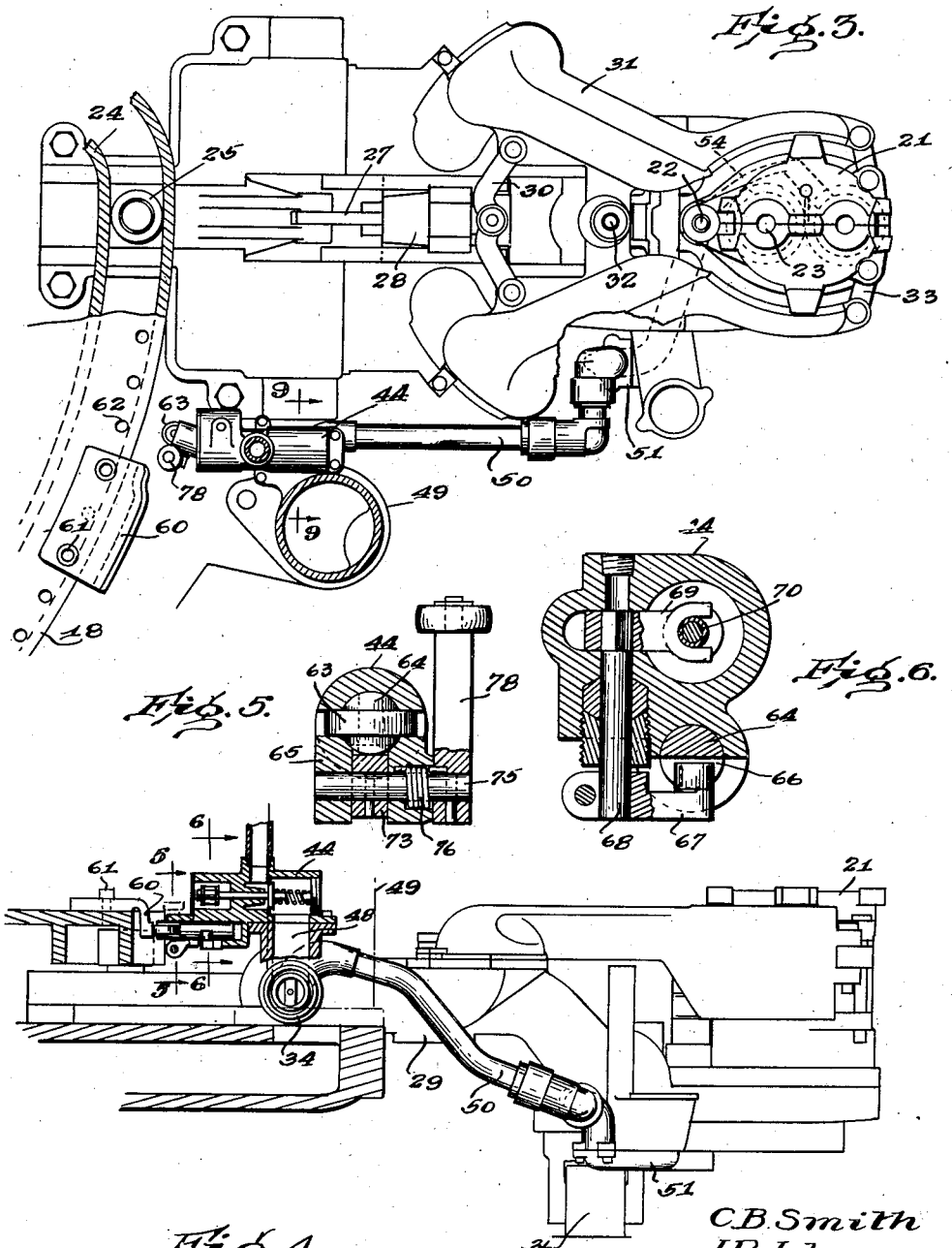

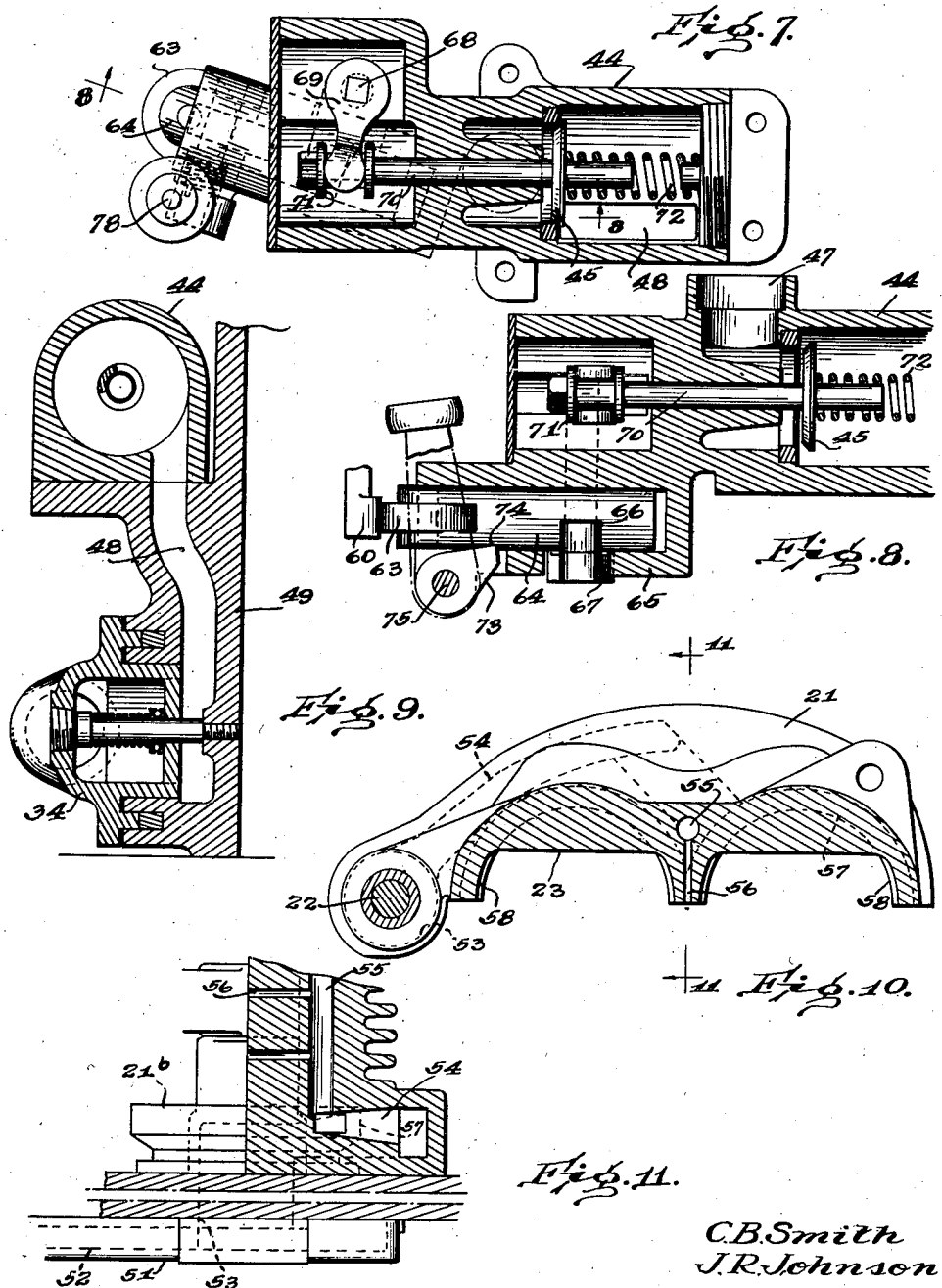

Patented Mar. 16, 1943

2,314,290

UNITED STATES PATENT OFFICE 2,314,290

GLASS MOLDING MACHINE

Charles B. Smith and John R. Johnson, Alton, Ill., assignors to Owens-Illinois Glass Company, a corporation of Ohio Application September 18, 1941, Serial No. 411,406

3 Claims. (Cl. 49—19)

Our invention relates to machines for forming glass articles in molds and particularly to means for producing a partial vacuum within a mold while an article is being blown therein.

An object of the invention is to provide novel and practical means for applying suction within a finishing mold while an article is being expanded therein by air pressure, for the purpose of relieving air pressure on the external surface of the article while being blown in the mold. We have found that in this manner a more accurate shaping of the articles which are being blown in the mold is obtained, the expansion of the articles is facilitated, and the articles are caused to retain the shape of the mold until discharged therefrom.

Other objects of the invention will appear hereinafter.

Referring to the accompanying drawings:

Fig. 3 is a part-sectional plan view showing one head or unit of the machine.

Fig. 4 is a sectional elevation of the same.

Figures 1, 2:
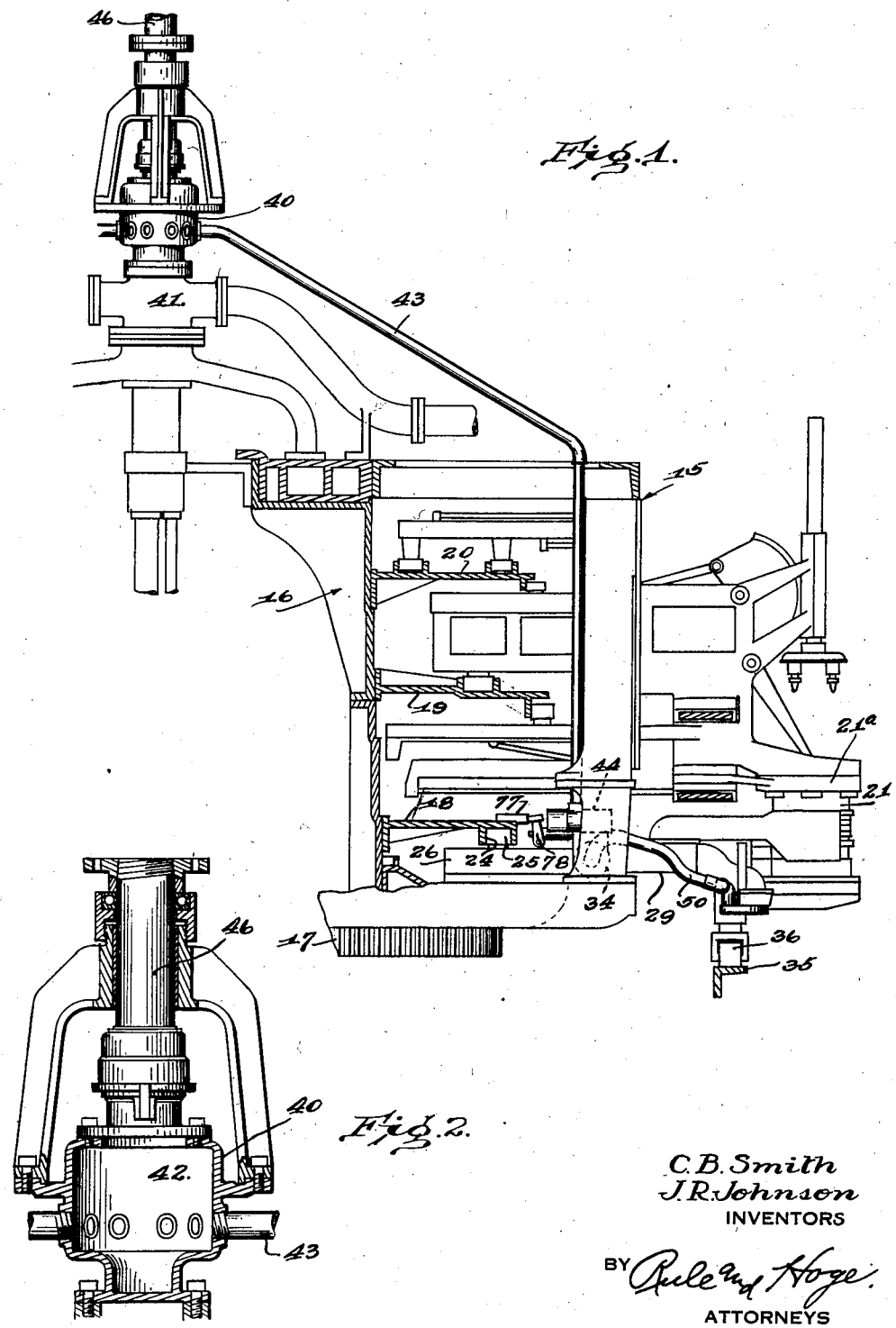
Fig. 1 is a fragmentary sectional elevation of an Owens type suction gathering machine to which the invention is applied.
Fig. 2 is a sectional elevation of the vacuum distributor head.

Figs. 5 and 6 are detail sections at the lines 5—5 and 6—6 respectively on Fig. 4.

Fig. 7 is a sectional plan view of the valve mechanism.

Fig. 8 is a section at the line 8—8 on Fig. 7.

Fig. 9 is a fragmentary sectional elevation showing a portion of the vacuum line, the section being taken substantially at the line 9—9 on Fig. 3.

Fig. 10 is a sectional plan view of one of the mold halves.

Fig. 11 is a section at the line 11—11 on Fig. 10.

Referring particularly to Fig. 1, the machine comprises a mold carriage 15 mounted for continuous rotation about the vertical axis of a stationary column 16. The carriage is rotated by an electric motor (not shown) operating through a train of gearing including an annular gear wheel 17 on the carriage. A plurality of units are arranged in an annular series and rotate with the carriage. Each unit may comprise a mold group and cooperating mechanism for actuating the molds and fabricating the articles therein. The mold group includes a blank mold which gathers a charge of glass by suction from a pool of molten glass and in which a parison or blank is formed, and a finishing mold to which the blank is transferred and in which it is blown to finished form. The mechanism for opening and closing the molds and effecting and controlling the various other operations required in fabricating the articles, is under the control of stationary cams on cam plates 18, 19, 20, mounted on the column 16.

Each finishing mold as herein shown comprises a pair of mold halves or sections 21 mounted to swing about a pivot pin 22 for opening the mold and for closing it about the parisons suspended from a neck mold 21ª. A plural cavity finishing mold is shown having mold cavities 23, permitting two bottles or other articles to be blown simultaneously in the mold. The finishing mold is opened and closed under the control of a cam 24 (Figs. 1 and 3) operating through mechanism including a cam roll 25 running on the cam. The roll is carried by a slide block 26 mounted to reciprocate radially of the mold carriage and having a link connection 27 with a slide 28 on a mold carrying arm 29. The slide 28 is connected through a pair of links 30 to arms 31 which are mounted to swing about a pivot 32. The forward ends of the arms 31 are connected through links 33 with the mold sections. The mold carrying arm 29 is carried on trunnions 34, permitting it to swing up and down about a horizontal axis. This allows the finishing mold to be swung upward and closed about the parison. The swinging movement of the arm 29 may be under the control of a stationary cam track 35 (Fig. 1) on which runs a roll 36 on said arm. The parts thus far described are conventional in Owens type suction machines.

The mechanism for applying suction within the finishing molds will now be described. Such mechanism includes a vacuum distributing head 40 (Figs. 1 and 2) which rotates with the mold carriage and which may be located directly over the usual vacuum distributing head 41 through which suction is applied to the blank molds for gathering the charges of glass therein. Suction or vacuum lines individual to the finishing molds extend from the vacuum chamber 42 within the distributor 40 to the finishing molds. The suction lines include pipes 43 extending from the distributor 40 to valve casings 44 in each of which is a valve 45 for opening and closing the suction line. A partial vacuum is continuously maintained within the chamber 42 and the pipes 43, the air being exhausted from said chamber through a central pipe 46 leading to any suitable air exhausting means.

Each vacuum pipe 43 opens into its valve chamber through a port 47 at one side of the valve, the suction line being extended from the opposite side of the valve through a vertically disposed channel 48 (Figs. 4 and 9) formed in the wall of a tubular supporting member 49 on which the valve casing 44 is mounted. The channel 48 opens at its lower end into the hollow trunnion 34. The vacuum line is extended from thence through a pipe line 50 to a mold plate 51, through a channel 52 in said plate, thence upwardly through a passageway 53 at the pivot 22 and from thence through horizontally disposed channels 54 extending through the mold sections 21. The channels 54 open into bores 55 extending upwardly through the mold wall. A plurality of lateral openings 56 extend from each bore 54 and terminate in the face of the mold cavity wall. The channel 54 also opens into semi-circumferential passageways 57 which extend along the periphery of the mold bottom plate 21b and communicate at 58 with the mold cavities.

When a valve 45 is opened as hereinafter described, suction is applied at the walls of the mold cavities and withdraws air that may be trapped between the mold walls and the parison which is being blown in the mold. The partial vacuum thus produced within the mold assists in the operation of expanding the parison and prevents air pressure from being developed by air which might be trapped between the expanding glass and mold wall and also assists in shaping the article completely to the contour of the mold and maintaining the shape of the article until it has hardened or set sufficiently to retain its shape independently of the supporting mold walls.

Each valve 45 may be opened immediately after the mold has closed about a parison or at any desired time interval after the closing of the mold. The valve is again closed before the mold is opened. The mechanism for opening and closing the valves will now be described. The valves are opened by a stationary cam 60 mounted on the cam plate 18 by means of bolts 61 which are extended through openings 62 formed in the cam plate and arranged to permit adjustment of the cam to any desired position along the cam plate. This permits the time of opening of the valve relative to the closing of the mold to be adjustably varied.

The cam 60 projects into the path of a cam roll 63 which is journalled in a slide 64 in the form of a plunger mounted for lengthwise sliding movement within an extension 65 of the valve casing. The slide 64 is formed with a notch 66 (Figs. 6 and 8) to receive a roll on the outer end of a rock arm 67 secured to the lower end of a vertical rock shaft 68 journalled in the valve casing. The upper end of the rock shaft is squared to receive a rock arm 69, the outer end of which is forked to straddle the stem 70 of the valve 45. The forked end of the arm 69 extends between the flanges of a spool 71 on the valve stem. When the cam roll 63 engages the cam 60 and is moved inwardly thereby, the shaft 68 is rocked and operates through the arm 69 to open the valve 45. The valve is closed by means of a coil spring 72. The suction within the vacuum line also tends to hold the valve closed.

When the valve is opened as just described it is locked in open position by means of a pawl 73 (Fig. 8) which engages a notch 74 formed in the slide 64. The pawl is keyed to a rock shaft 75 journalled in the casing 65 and is held in the notch 74 by a torsion spring 76 (Fig. 5). The pawl is released by a stationary cam 77 (Fig. 1) which operates to swing a rock arm 78 keyed to the shaft 75. The cam 77 is mounted on the cam plate 18.

Modifications may be resorted to within the spirit and scope of our invention.

We claim:

1. The combination of a rotatable mold carriage, a mold on the carriage, means providing a vacuum line rotating with the carriage, a valve in said line, automatic means for opening the valve including a stationary cam, a slide mounted on the carriage, means actuated by the cam for moving the slide in one direction, means actuated by the slide for opening the valve, a holding pawl arranged to engage the slide and hold it in position for holding the valve open, and automatic means for releasing said pawl and permitting the mold to close when the carriage reaches a predetermined position during its rotation.

2. The combination of a rotatable mold carriage, a mold on the carriage, means providing a vacuum line rotating with the carriage, a valve in said line, automatic means for opening the valve including a stationary cam, a slide mounted on the carriage, means actuated by the cam for moving the slide in one direction, means actuated by the slide for opening the valve, a holding pawl arranged to engage the slide and hold it in position for holding the valve open, a second stationary cam, means actuated by said second cam for disengaging said holding pawl from the slide, and means for automatically closing the valve when said pawl is released.

3. The combination of a rotatable mold carriage, a mold thereon, means on the carriage providing a suction line leading to the mold, valve mechanism on the carriage including a valve arranged to open and close said line, a valve stem connected to said valve, a rock shaft, a rock arm on said shaft operatively connected to the valve stem, a slidable member, a second rock arm on said rock shaft operatively connected to said slidable member, a holding pawl arranged to hold said slidable member in position for holding the valve open, and stationary cams operable respectively to rock said shaft and to release said pawl.

CHARLES B. SMITH.
JOHN R. JOHNSON.